United States Patent [19]
Maxwell et al.

[11] Patent Number: 6,011,107
[45] Date of Patent: Jan. 4, 2000

[54] WATER WASHABLE PROTECTIVE COATING

[75] Inventors: Jeffrey Maxwell; Xenophon G. Saquet, both of Ferndale, Mich.

[73] Assignee: Gage Products Company, Ferndale, Mich.

[21] Appl. No.: 09/139,818

[22] Filed: Aug. 25, 1998

Related U.S. Application Data

[60] Provisional application No. 60/056,989, Aug. 26, 1997.
[51] Int. Cl.[7] .............................. C08L 33/06; C08L 35/02
[52] U.S. Cl. ......................... 524/566; 524/487; 524/389; 524/380; 524/558; 524/556; 524/560; 525/119; 525/163; 525/221; 525/228
[58] Field of Search ..................................... 524/566, 487, 524/389, 380, 558, 560, 556; 525/119, 163, 221, 228

[56] References Cited

U.S. PATENT DOCUMENTS 5,567,756  10/1996  Swidler .................................... 524/566

*Primary Examiner*—James J. Seidleck
*Assistant Examiner*—Olga Asinossky
*Attorney, Agent, or Firm*—Gifford, Krass, Groh, Sprinkle, Anderson & Citkowski, P.C.

[57] ABSTRACT

A coating composition for producing a water washable, protective coating, comprising, by weight, 10–50% of a mixture of at least two acrylic polymers each having different molecular weights, acid numbers, and glass transition temperatures. The composition includes water and an alkali, in an amount sufficient to maintain the composition at a pH in the range of 7.5 to 9.5 and is further characterized in that the average molecular weight of the mixture of the at least two acrylic polymers is in the range of approximately 35,000 to 100,000. The average acid number of the mixture is in the range of approximately 65 to 150 and the glass transition temperature of a coating produced by the evaporation of the water from the composition is in the range of 0 to 70° C.

41 Claims, No Drawings

WATER WASHABLE PROTECTIVE COATING

This application claims priority of United States Provisional Application No. 60/056,989 filed Aug. 26, 1997.

FIELD OF THE INVENTION

This invention relates generally to polymeric coatings. More particularly, the invention relates to an acrylic based protective coating which can be deposited from an aqueous solution, and which may be removed from an article by washing with neutral pH water.

BACKGROUND OF THE INVENTION

Protective coatings are applied to automobiles and other articles to protect their surface finishes from dirt, scratches and other damage occurring during manufacture, shipping and storage. Such coatings should be tough, easy to apply, easy to remove and should not cause any harm to the article to which they are applied. Protective coatings typically comprise formulations including waxes, polymers and the like. Most of such coatings are deposited from compositions including organic solvents therein. Removal of these coatings requires either organic solvents or wash water having a relatively alkaline pH. Organic solvents or non-neutral aqueous solutions can cause damage to various articles of manufacture, and complicate the formulation and handling of such coatings.

In addition to not causing harm to the article to which they are applied, protective coatings, particularly when applied over a clearcoat layer applied over a paint layer, must also resist etching and distorting the clearcoat layer following the exposure or application of heat to the protective coating. This situation commonly arises during the application of trim components such as pin-striping when heat is applied directly to the protective coating in order to facilitate the adhesion of pin-striping to the surface of the automobile or when an automobile leaves the assembly plant without first having the protective coating removed and is then exposed to heating by sunlight. Automobile manufacturers, therefore, require that these protective coatings resist chemical etching and distortion of the underlying clearcoat of the automobile upon exposure to heat.

Accordingly, there is a need for a protective coating formulation which is aqueous based, and which has a neutral or near neutral pH. It is further desirable that this formulation provide a tough, durable, protective coating, but that the coating be removable from the surface by washing with neutral or near neutral pH water. It would be further desirable and advantageous to have a protective coating which will not etch nor distort the underlying clearcoat layer following exposure to heat. As will be described hereinbelow, the present invention provides a composition fulfilling these criteria.

DETAILED DESCRIPTION OF THE INVENTION

The protective coatings of the present invention are based upon acrylic polymers. As is known in the art, such materials include polymers of acrylic acid as well as substituted acrylic acids such as methyl methacrylate, as well as copolymers such as styrene acrylic copolymers, and the like. The coatings of the present invention are durable, and resistant to ambient humidity; however, they are readily removed from a surface by washing with water having a neutral, or near neutral, pH. In the context of the present disclosure, a near neutral pH refers to water having a pH which is only slightly acid or slightly alkaline. Generally, a near neutral pH is in the range of 4.5–9.5. It should also be noted that all formulations given herein are specified on a weight basis.

The protective coatings of the present invention are applied from an aqueous solution which has a pH in the range of 7.5–9.5. The compositions of the present invention may be applied by spraying, brushing, dipping or any other such coating technique. The final properties of the coating may be adjusted for various applications. In those instances where a relatively thick coating is required, a higher viscosity coating solution is employed. Coatings which will encounter relatively low temperature conditions may be made relatively soft so as to resist cracking, while coatings which will be employed in high temperature conditions may be made to have a relatively high glass transition temperature, so that they will retain film strength at elevated temperatures.

Acrylic based materials have previously been employed in a variety of coating applications; however, it has been found, in accord with the present invention, that superior results are achieved when a protective coating is prepared from a blend of acrylic polymers, having different molecular weights, acid numbers and glass transition temperatures. Preferably, the composition of the present will include, on a weight basis, approximately 10–50% of a mix of at least two acrylic polymers having different molecular weights, acid numbers and glass transition temperatures. The polymers are mixed with water, and an alkali, such as sodium hydroxide, potassium hydroxide or mixtures thereof, in an amount, ranging from 0.5 to 2.5%, by weight, sufficient to maintain the composition at a pH of 7.5 to 9.5. In particular embodiments, the composition are characterized in that the average molecular weight of the polymers comprising the mixture is in the range of approximately 35,000 to 100,000, and the average acid number of the mix is in the range of 65–150, and the glass transition temperature of a coating produced by the evaporation of water from the composition is in the range of 0–70° C.

In some particular embodiments of the invention, the mix of acrylic polymers includes a first polymer having a molecular weight of no more than 2,000 and an acid number of at least 180, and more preferably 200. One example of such materials comprises the styrene acrylic copolymer sold by the B.F. Goodrich Corporation under the designation Carboset® 1161 or 1162. The aqueous solutions of these materials exhibit a decrease in viscosity at mildly alkaline pHs, typically in the range of 8.0–9.5. This is an important feature of the present invention, because viscosity is often a limiting factor in determining the total solids content in coating compositions. Generally, users wish to have a high solids composition so as to minimize the amount of solution handled, and drying time; however, high solids compositions often have very high viscosities preventing them from being readily applied in conventional coating processes. It has been found that inclusion of the low molecular, high acid number polymers serves to decrease the viscosity of the resultant solution, permitting the use of high solids formulations. The low molecular weight, high acid number acrylic polymers are not good film formers, and for this reason, the compositions of the present invention will also include a higher molecular weight, lower acid number film forming polymer, in an amount sufficient such that the average molecular weight of the resultant composition is at least approximately 35,000.

In a preferred embodiment of the present invention, a coating composition for depositing a protective layer comprises, by weight, 10–50% of a mixture of at least two acrylic polymers having different molecular weights, acid numbers, and glass transition temperatures. The composition includes water and an alkali in an amount sufficient to maintain the composition at a pH in the range of 7.5 to 9.5. The composition is characterized in that the average molecular weight of the mixture of at least two acrylic polymers is in the range of 35,000 to 100,000, the average acid number of the mixture is in the range of 65 to 150, and the glass transition temperature of a coating produced by the evaporation of the water from the composition is in the range of 0 to 70° C. The alkali utilized in this embodiment preferably includes potassium hydroxide in an amount ranging from approximately 0.5–2.50%, by weight, of the composition. Additionally, the alkali can be sodium hydroxide in an amount ranging from approximately 0.5–2.50%, by weight, of the composition. In a most preferred embodiment, both potassium hydroxide and sodium hydroxide are included in the coating composition in an amount ranging from approximately 0.5–2.50%, by weight, of the composition. In this embodiment, the glass transition temperature of the coating composition preferably ranges from approximately 0 to 10° C. Most preferably, the glass transition temperature of the coating composition is in the range of approximately 3 to 8° C. This embodiment of the present invention, referred to in Table 1 as 1019–118A, comprises, by weight, approximately 6.00% Carboset 525 resin, approximately 9.1% Carboset 515 resin, approximately 0.6% sodium hydroxide, and approximately 0.63% potassium hydroxide. The resins and alkali are dissolved in deionized water, in an amount of approximately 83% of the composition. The water is preferably heated to 70–80° C. In addition to the foregoing, the composition includes approximately 0.27% of a water softening ion chelating agent sold by the Ashland Corporation under the trade name Versene 100, approximately 0.3% of sodium lauryl sulfate, and approximately 0.02% of an antifoaming agent sold under the trade name Foamaster 111. The resultant composition can be applied to an article by spraying, dipping, or brushing, and is subsequently dried to remove the water solvent to yield a durable and scratch resistant film. The overall Tg of the resultant film is approximately 4° C. and the average molecular weight of the resin in the film is approximately 87,000.

Applicants have found that both the addition of potassium to the composition along with a Tg in the range of approximately 0–8° C. are critical to eliminating the etching and distortion problem discussed above. Table 1 illustrates several embodiments of the subject coating composition.

TABLE 1

|  | Formulation 1019-118A | Formulation G-2000 CN 71965 Batch #20528 | Formulation 1019-146 | Formulation 1019-116 | Formulation 1019-147 |
| --- | --- | --- | --- | --- | --- |
| Deionized Water | 83.07 | 73.79 | 83.05 | 77.63 | 82.38 |
| NaOH Bead | 0.6 | 2.28 | 0.56 |  | 0.55 |
| KOH (Flake) | 0.63 |  | 0.59 | 2.08 | 0.58 |
| Versene 100 | 0.27 | 0.26 | 0.25 | 0.57 | 0.25 |
| Carboset 525 | 6.01 | 3.73 | 2.42 | 0.91 | 0.80 |
| Carboset 526 |  | 3.73 |  | 1.84 |  |
| Carboset 527 |  |  | 4.03 |  | 4.79 |
| Carboset 1162 |  |  |  |  |  |
| Carboset 1161 |  | 10.28 |  | 3.65 |  |
| Carboset 515 | 9.12 | 5.29 | 8.86 | 12.47 | 10.39 |
| Sodium Lauryl Sulfate | 0.27 | 0.29 | 0.24 | 0.66 | 0.24 |
| Tinuvin 1130 (UV absorber) |  | 0.26 |  |  | 0.23 |
| Foamaster 111 | 0.02 |  | 0.02 |  | 0.02 |
| CS-1135 (antibacterial) |  | 0.09 |  | 0.19 |  |
| TOTAL % | 100 | 100 | 100 | 100 | 100 |
| Avg MW | 87675 | 61300 | 47740 | 29950 | 27050 |
| Cal. Tg(C) | 4.1 | 45 | 7.9 | 9.53 | 4.79 |

In another embodiment of the present invention, a coating composition for depositing a protective layer comprises, by weight, 1–5% of a first acrylic polymer which has a molecular weight in the range of 125,000 to 175,000, an acid number in the range of 80–120 and a glass transition temperature (Tg) in the range of 60–80° C. The composition includes a second acrylic polymer, in an amount of 6–15%, and this second acrylic polymer has a molecular weight in the range of 1,000–2,000, an acid number of 180–230 and a Tg in the range of 70–110. The composition also includes a third acrylic polymer, in an amount of approximately 3–10%; and this third acrylic polymer has a molecular weight in the range of 175,000–250,000, an acid number of approximately 60–90, and a Tg in the range of 20–50. The composition also includes 3–10% of a fourth acrylic polymer having a molecular weight in the range of 5,000–10,000, an acid number in the range of 50–70 and a Tg of less than 0° C. The foregoing acrylic polymers are dissolved in water, together with an alkali, such as sodium hydroxide, potassium hydroxide, ammonia, triethanolamine or the like, in an amount sufficient to solubilize the polymers and maintain the composition at a pH in the range of 7.5–9.5.

The viscosity of the coating compositions will depend upon the particular application; but, typical viscosities are in the range of 30–1500 centipoise at 20° C., as measured by a Brookfield viscometer using a #1 spindle at 50 rpm.

The composition, in one embodiment, includes, by weight, approximately 10–30% of the foregoing acrylic resins. In one particularly preferred embodiment, the resins collectively total 20% by weight of the composition.

Any of the above-described compositions may further include other, ancillary ingredients such as water softening agents, chelating agents, surfactants and the like. These materials are typically present in relatively small amounts such as 0.1–1.0%. The composition may also include other ancillary ingredients such as U.V. blocking agents, biocides, fungicides, defoamers, fragrances and colors.

In accord with the present invention, it has been found that the addition of a relatively small amount of emulsified wax enhances the resistance of the dried film to ambient humidity, but does not adversely affect rinsibility of the dried film. The wax is typically employed as an approximately 50% emulsion in water, and this emulsion is present in a weight amount of approximately 0.5–2.0% of the composition.

There are a variety of acrylic polymers which may be employed in the practice of the present invention. One group of materials comprises styrene-acrylic copolymers (also referred to as a styrenated acrylics) such as those sold by the B.F. Goodrich corporation under the designation Carboset. These materials are available in various grades; and Carboset 526 may be advantageously employed as the first acrylic polymer; Carboset 1161 or 1162 may be employed as the second acrylic polymer; Carboset 525 may be employed as the third acrylic polymer, and Carboset 515 may be employed as the fourth acrylic polymer. Other similar materials are available from the S.C. Johnson corporation under the designation Joncryl, or from ICI Inc. under the name Zeneca. Other polymer suppliers such as Rhom & Haas and Rhone-Poulenc also sell similar materials.

One illustrative, embodied composition of the present invention comprises, by weight, 1.2% Carboset 526 resin, 9.0% Carboset 1161 resin, 4.0% Carboset 525 resin, and 4.0% Carboset 515 resin. The resins are dissolved in deionized water, in an amount of 79% of the composition. The water is preferably heated to 70–80° C., and includes approximately 2.2% by weight of the composition of a 50% solution of sodium hydroxide to facilitate dissolution of the resins, and to maintain the pH of the resultant solution in the range of approximately 7.5–9.5. In addition to the foregoing, the composition includes 0.3% of water softening and ion chelating agent sold by the Ashland corporation under the designation Versene 100, and 0.3% of sodium lauryl sulfate, which is used as a wetting agent and rinse aid.

The foregoing compositions may be applied to an article by spraying, dipping or brushing, and is subsequently dried to remove the water solvent therefrom. The resultant film is durable and scratch resistant. The overall Tg of the resultant film is approximately 53° C. and the average molecular weight of the resin in the film is approximately 59,000.

Another embodied composition of the present invention comprises, on a weight basis, 2.38% Carboset 525 resin; 1.59% Carboset 526 resin; 3.97% Carboset 527 resin; 2.38% Carboset 1162 resin; 7.94% Carboset 1161 resin; 6.59% Carboset 515 resin; 0.27% sodium lauryl sulfate surfactant and 0.36% of the above-referenced Versene 100 water softening agent. The resins are dissolved in deionized water in an amount of 69.21% of the composition and the water includes 2.67% by weight of sodium hydroxide. The average molecular weight of this composition is approximately 38,000, and the glass transition temperature of the resultant dried film is calculated to be approximately 40° C.

Another coating composition comprises, on a weight basis, 2.89% Carboset 525 resin; 0.87% Carboset 526 resin; 8.67% Carboset 1161 resin and 3.92% Carboset 515 resin. The resins are dissolved in 80.72% de-ionized water, along with 1.82% sodium hydroxide. The composition also includes 0.36% Versene 100 water softening agent and 0.28% sodium lauryl sulfate, as in previous examples. This particular composition also includes 0.23% of an ultra-violet light absorbing agent sold under the designation Tinuvin 1130, and 0.24% of an anti-bacterial agent sold under the designation CS-1135. These last two agents increase the stability of the resultant film to ambient conditions. The average molecular weight of the resultant composition is approximately 41719, and the glass transition temperature of the resultant film produced thereby is calculated to be approximately 50° C.

As noted above, the proportions of the various resins may be varied within the listed ranges so as to adjust the overall performance of the film. For example, increase in the amount of the low molecular weight Carboset 515 resin will soften the resultant film, while increasing the amount of the relatively high molecular weight Carboset 525 resin will harden the film. It has also been found that substituting Carboset 1162 for Carboset 1161 will produce a somewhat harder film, more useful for high temperature applications. Also, it has been found that the viscosity can be adjusted by varying the relative amounts of the resin components. The pH can be adjusted by adjusting the concentration of alkali in the composition. While the foregoing compositions include Carboset resins, sold by the B.F. Goodrich Corporation, similar resins are available from other suppliers, and may be employed in the present invention. Also, as noted above, a relatively small amount of wax emulsion may be added to the material to enhance resistance to humidity. Surprisingly enough, addition of this emulsion does not detract from the water rinsibility of the film.

In addition, the drying time of the film can be decreased by replacing up to half of the water with an alcohol such as isopropanol or ethanol.

The following examples are given for the purpose of illustrating various embodiments of the invention and are not meant to limit the present invention in any way.

EXAMPLES

Example 1

Removability of Coating from an Article

| | |
|---|---|
| Standard: | GM 9982223 04/94 |
| Material: | G-2000 Anti-Scratch Coating Batch #20528 - See Table 1 for Composition |

Paint System Identification:

| A. | Phosphate: | B952 P60 | B: | Phosphate: | B952 P60 |
|---|---|---|---|---|---|
| | ECoat: | ED5000 | | ECoat: | ED5050A |
| | Basecoat: | 542AB921 Black | | Basecoat: | 408AB921 Black |
| | Clearcoat: | RK 8010 Gen 4A | | Clearcoat: | RK8018 |

Transit Film Build Conditions:

Normal=N

Low=L

High=H

Removal Procedure:

Panels are rinsed under room temperature water for up to five minutes and then blown off with air after exposures

| Evaluation 3.3.1: | Moisture Resistance |
|---|---|
| Test Method: | GM 4465P 07/95 |
| Exposure: | 96 Hours |
| Recovery: | 24 Hours |
| Exposure Chamber: | Singleton Model 24 (ACT #87) |
| Examination: | Visual examination for loss of film integrity or softening |
| Rating Scale: | 0 = No effect (etching) from contaminants |
| | 1 = Trace/slight effect |
| | 2 = Moderate effect |
| | 3 = Pronounced/severe effect |

Moisture Resistance Test Data

| ID | Film Integrity | Softening |
|---|---|---|
| A1N | No transit film remaining | n/a |
| B1N | No transit film remaining | n/a |

The results of this example demonstrate that a film coating in accordance with the invention can be rinsed from an article with water.

Example 2
Discoloration or Cracking

| Standard: | GM 9982223 04/94 |
|---|---|
| Material: | G-2000 Anti-Scratch Coating Batch #20528 - See Table 1 for Composition |
| Evaluation 3.3.2: | Heat Age |
| Exposure: | 336 hours at 82 ± 2° C. |
| Exposure Chamber: | Despatch LDB 2-27-4 Oven (ACT #207) |
| Examinations: | Visual examination for discoloration or cracking. Removability |
| Rating Scale: | 0 = No effect (etching) from contaminants |
| | 1 = Trace/slight effect |
| | 2 = Moderate effect |
| | 3 = Pronounced/severe effect |

Heat Age Test Data

| ID | Visual Change | Removability |
|---|---|---|
| A1L | 0 | 0 |
| A1N | 0 | 0 |
| A1H | 0 | 0 |
| B1L | 0 | 0 |
| B1N | 0 | 0 |
| B1H | 0 | 0 |

The results of this example demonstrate that a coating in accordance with the present invention was removable and did not discolor an article after prolonged exposure to heat.

Example 3
Resistance to Changes in the Coated Film Due to U.V. Exposure

| Evaluation 3.3.7: | QUV Exposure |
|---|---|
| Test Method: | GM 9125P 07/91 |
| Material: | G-2000 Anti-Scratch Coating Batch #20528 - See Table 1 for Composition |
| Cycle: | 8 hours UV at 70 ± 2° C. |
| | 4 hours condensation at 50 ± 2° C. |
| Exposure: | 250 and 500 hours |
| Exposure Chamber: | Atlas UV-CON Cabinet (ACT #52) |
| Examinations: | Visual examination for marring, cracking, discoloration, etc. |
| | Removability |

QUV Exposure Test Data

| ID | Exposure | Visual Change | Removability |
|---|---|---|---|
| A1N | 250 Hours | 0 | * |
| A1H | 250 Hours | 0 | * |
| B1N | 250 Hours | 0 | * |
| B1H | 250 Hours | 0 | * |
| A1N | 500 Hours | 0 | * |
| A1H | 500 Hours | 0 | * |
| B1N | 500 Hours | 0 | * |
| B1H | 500 Hours | 0 | * |

*No transit film remained on the panels after exposure

The results illustrated in this example demonstrate that a coating composition in accordance with the present invention resists changes due to prolonged U.V. light exposure.

Example 4
Resistance to Chemical Etching

| Evaluation #4: | Resistance to Chemical Etching |
|---|---|
| Test Method: | GM 9533P 07/95 Method 3 |
| Material: | G-2000 Anti-Scratch Coating Batch #20528 - See Table 1 for Composition |
| Procedure: | Apply 0.05 mL of test solution to each panel. Leave at room temperature for 30 minutes, then place in preheated chambers at specified temperatures for 30 minutes. Remove material and evaluate. |
| Test Temperatures: | 50 ± 2° C., 60 ± 2° C., 70 ± 2° C., 80 ± 2° C. |
| 50° C. Chamber: | Cincinnati Sub Zero (ACT #579) |
| 60° C. Chamber: | Hotpack (ACT #7) |
| 70° C. Chamber: | Thermotron Model SM-32C (ACT #175) |
| 80° C. Chamber: | Thermotron Model SM-32C (ACT #26) |
| Examination: | Visual examination for change |
| Degree of Change: | None: No change |
| | Slight: Barely observable with normal examination |
| | Moderate: Modest change, Readily noticeable |
| | Pronounced: Distinct change, Easily observed with casual examination |
| Test Materials: | A - G-2000 Batch #20528 undiluted - See Table 1 |
| | B - G-2000 Batch #20528 diluted with deionized water to 10% non-volatiles |
| | C - G-2000 Batch #1019118A undiluted - See Formula 1019-118A in Table 1 |
| | D - G-2000 Batch #1019118A diluted with deionized water to 10% non-volatiles |
| | E - Competitor's material from Ford Kentucky Truck Plant 1/15/98 undiluted |
| | F - Competitor's material from Ford Kentucky Truck Plant 1/15/98 diluted with deionized water to 10% non-volatiles |
| | G - Deionized Water |

Resistance to Chemical Etching Test Data:

| Paint System | Temperature | Material A | Material B | Material C |
|---|---|---|---|---|
| A | 50° C. | Slight Swelling | Slight Swelling | No Change |
| B | 50° C. | Slight Swelling | Slight Swelling | No Change |
| A | 60° | Slight Swelling | Slight Swelling | No Change |
| B | 60° | Slight Swelling | Slight Swelling | No Change |
| A | 70° | Slight Swelling | Slight Swelling | No Change |
| B | 70° | Slight Swelling | Slight Swelling | No Change |
| A | 80° | Slight Swelling | Slight Swelling | No Change |
| B | 80° | Slight Swelling | Slight Swelling | No Change |

| Paint System | Temperature | Material D | Material E | Material F |
|---|---|---|---|---|
| A | 50° C. | No Change | Slight Swelling | Slight Swelling |
| B | 50° C. | No Change | Slight Swelling | Slight Swelling |
| A | 60° | No Change | Slight Swelling | Slight Swelling |

| | | | | |
|---|---|---|---|---|
| B | 60° | No Change | Shght Swelling | Slight Swelling |
| A | 70° | No Change | Slight Swelling | Slight Swelling |
| B | 70° | No Change | Slight Swelling | Slight Swelling |
| A | 80° | No Change | Slight Swelling | Slight Swelling |
| B | 80° | No Change | Slight Swelling | Slight Swelling |

| Paint System | Temperature | Material G |
|---|---|---|
| A | 50° C. | No Change |
| B | 50° C. | No Change |
| A | 60° | No Change |
| B | 60° | No Change |
| A | 70° | No Change |
| B | 70° | No Change |
| A | 80° | No Change |
| B | 80° | No Change |

Note
No etching was observed at any condition

The results of this example demonstrate that test materials C and D did not cause swelling of the underlying clearcoat over which materials C and D were applied. Materials C and D correspond to Formulation 1019–118A of Table 1. This formulation includes both potassium hydroxide and sodium hydroxide, has a Tg of approximately 4 and an average molecular weight of approximately 87,000.

The aforedescribed materials have significant utility in the manufacture of motor vehicles. They may be easily applied to cover the painted and plated portions of the vehicle, and their durability protects the finish from scratches during assembly. At final stage in their assembly, most motor vehicles are subjected to a water wash for the purpose of testing their water tightness, and this water wash will function to remove the protective coating.

While some specific formulations have been disclosed herein, it is to be understood that other variations and modifications of the aforedescribed compositions may be implemented in accord with the present invention. The foregoing are illustrative of particular embodiments, but not meant to be limitations upon the practice thereof It is the following claims, including all equivalents, which define the scope of the invention.

We claim:

1. A coating composition for producing a water washable, protective coating, said composition comprising, by weight:
   10–50% of a mixture of at least two acrylic polymers, said polymers having different molecular weights, acid numbers and glass transition temperatures;
   water; and
   an alkali, in an amount sufficient to maintain the composition at a pH in the range of 7.5 to 9.5, said composition further characterized in that the average molecular weight of said mixture of at least two acrylic polymers is in the range of 35,000 to 100,000, the average acid number of said mixture is in the range of 65 to 150, and the glass transition temperature of a coating produced by the evaporation of the water from said composition is in the range 0 to 70° C.

2. A composition as in claim 1, wherein said alkali includes potassium hydroxide.

3. A composition as in claim 1, wherein said alkali includes sodium hydroxide.

4. A composition as in claim 3, wherein said alkali includes a mixture of potassium and sodium hydroxides.

5. A composition as in claim 2, wherein said potassium hydroxide comprises, by weight, 0.5–2.50% of said composition.

6. A composition as in claim 3, wherein said sodium hydroxide comprises, by weight, 0.5–2.50% of said composition.

7. A composition as in claim 1, wherein the glass transition temperature of said coating composition is in the range of approximately 0 to 10° C.

8. A composition as in claim 7, wherein the glass transition temperature of said coating composition is in the range of approximately 3 to 8° C.

9. A composition as in claim 1, wherein at least one of said acrylic polymers is a styrenated acrylic polymer.

10. A composition as in claim 1, wherein all of said acrylic polymers are styrenated acrylic polymers.

11. A composition as in claim 1, having a viscosity in the range of 30 to 1500 centipoise at 20° C.

12. A composition as in claim 1, wherein said polymer mix comprises, by weight, 10–35% of said composition.

13. A composition as in claim 1, further including, by weight, 0.5–2.0% of an emulsion of 50% wax in water.

14. A composition as in claim 1, further including 0.1–1.0% of a chelating agent.

15. A composition as in claim 1, further including, by weight, 0.1–1.0% of a surfactant.

16. A composition as in claim 1, further including at least one auxiliary ingredient selected from the group consisting of: UV blocking agents, biocides, fungicides, defoamers, fragrances, coloring agents, and combinations thereof.

17. A composition as in claim 1 including a third acrylic polymer.

18. A composition as in claim 17, wherein said first, second, and third acrylic polymers total, by weight, approximately 15% of said composition.

19. A composition as in claim 1, further including an alcohol to decrease the drying time of said coating.

20. A dried film prepared by evaporating water from the composition of claim 1.

21. A dried film as in claim 20, wherein the Tg of said film is in the range of approximately 0 to 10° C.

22. A coating composition for producing a water washable, protective coating, said composition comprising, by weight:
   1–5% of a first acrylic polymer having a molecular weight in the range of 125,000–175,000, an acid number in the range of 80–120, and a Tg in the range of 60–80° C.;
   6–15% of a second acrylic polymer having a molecular weight in the range of 1,000–2,000, an acid number in the range of 180–230, and a Tg in the range of 70–110° C.;
   3–10% of a third acrylic polymer having a molecular weight in the range of 175,000–250,000, an acid number in the range of 60–90, and a Tg in the range of 20–50° C.;
   3–10% of a fourth acrylic polymer having a molecular weight in the range of 5,000–10,000, an acid number in the range of 50–70, and a Tg of less than 0° C.;
   water; and
   an alkali in an amount sufficient to maintain the composition at a pH in the range of 7.5–9.5.

23. A composition as in claim 22, wherein said first, second, third and fourth acrylic polymers collectively total, by weight, 10–40% of said composition.

24. A composition as in claim 22, wherein said first, second, third and fourth acrylic polymers total, by weight, 20% of said composition.

25. A composition as in claim 22, having a viscosity in the range of 30–1500 centipoise at 20° C.

26. A composition as in claim 22, further including, by weight, 0.5–2.0% of an emulsion of 50% wax in water.

27. A composition as in claim 22, further including 0.1–1.0% of a chelating agent.

28. A composition as in claim 22, further including, by weight, 0.1–1.0% of a surfactant.

29. A composition as in claim 22, further including at least one auxiliary ingredient selected from the group consisting of: UV blocking agents, biocides, fungicides, defoamers, fragrances, coloring agents, and combinations thereof.

30. A composition as in claim 22, further including an alcohol to decrease the drying time of said coating.

31. A composition as in claim 22, comprising, by weight, 1.2% of said first acrylic polymer; 9.0% of said second acrylic polymer; 4.0% of said third acrylic polymer; 4.0% of said fourth acrylic polymer; 0.3% of a chelating agent; and 0.3% of a surfactant.

32. A dried film prepared by evaporating water from the composition of claim 22.

33. A dried film as in claim 32, wherein the Tg of said film is in the range of 40–70° C.

34. A water washable, protective coating comprising, by weight:
  5–25% of a first acrylic polymer having a molecular weight in the range of 125,000–175,000, an acid number in the range of 80–120, and a Tg in the range of 60–80° C.;
  30–60% of a second acrylic polymer having a molecular weight in the range of 1,000–2,000, an acid number in the range of 180–230, and a Tg in the range of 70–110° C.;
  15–50% of a third acrylic polymer having a molecular weight in the range of 175,000–250,000, an acid number in the range of 60–90, and a Tg in the range of 20–50° C.; and
  15–50% of a fourth acrylic polymer having a molecular weight in the range of 5,000–10,000, an acid number in the range of 50–70, and a Tg of less than 0° C.

35. A coating as in claim 34, further including, by weight, 1–5% wax.

36. A composition as in claim 34, further including at least one auxiliary material therein selected from the group consisting of: surfactants, chelating agents, UV blocking agents, biocides, fungicides, coloring agents, fragrances, and combinations thereof.

37. A composition as in claim 34, further including an alcohol to decrease the drying time of said coating.

38. A coating composition for producing a water washable, protective coating, said composition comprising, by weight:
  10–50% of a mix of at least two acrylic polymers, said polymers having different molecular weights, acid numbers and glass transition temperatures;
  water; and
  an alkali, in an amount sufficient to maintain the composition at a pH in the range of 7.5 to 9.5, said composition further characterized in that the average molecular weight of said mix of at least two acrylic polymers is in the range of 35,000 to 70,000, the average acid number of said mix is in the range of 65 to 150, and the glass transition temperature of a coating produced by the evaporation of the water from said composition is in the range 40 to 70° C.

39. A composition as in claim 38, having a viscosity in the range of 30 to 1500 centipoise at 20° C.

40. A composition as in claim 38, wherein said polymer mix comprises, by weight, 10–35% of said composition.

41. A coating composition for producing a water washable, protective coating, said composition comprising, by weight:
  10–50% of a mixture of at least two acrylic polymers, said polymers having different molecular weights, acid numbers and glass transition temperatures;
  water; and
  an alkali selected from the group consisting essentially of potassium hydroxide, sodium hydroxide, or mixtures thereof, in an amount sufficient to maintain the composition at a pH in the range of 7.5 to 9.5, said composition further characterized in that the average molecular weight of said mixture of at least two acrylic polymers is in the range of 35,000 to 100,000, the average acid number of said mixture is in the range of 65 to 150, and the glass transition temperature of a coating produced by the evaporation of the water from said composition is in the range of 0 to 70° C.

* * * * *